(No Model.) 4 Sheets—Sheet 1.

W. R. POPE & E. L. POOLE.
AUTOMATIC PHOTOGRAPHIC APPARATUS.

No. 396,428. Patented Jan. 22, 1889.

(No Model.) 4 Sheets—Sheet 2.

W. R. POPE & E. L. POOLE.
AUTOMATIC PHOTOGRAPHIC APPARATUS.

No. 396,428. Patented Jan. 22, 1889.

(No Model.) 4 Sheets—Sheet 3.

W. R. POPE & E. L. POOLE.
AUTOMATIC PHOTOGRAPHIC APPARATUS.

No. 396,428. Patented Jan. 22, 1889.

Witnesses,
Jno. G. Hinkel Jr.
Sidney L. Johnson

Inventors,
W. R. Pope
E. L. Poole
by Foster & Freeman
Attorneys (No Model.) 4 Sheets—Sheet 4.

W. R. POPE & E. L. POOLE.
AUTOMATIC PHOTOGRAPHIC APPARATUS.

No. 396,428. Patented Jan. 22, 1889.

Witnesses
Jno. G. Hinkel Jr.
H. T. McArthur

Inventors
W. R. Pope
E. L. Poole
by Foster Freeman
Attorneys

UNITED STATES PATENT OFFICE.

WILLIAM R. POPE AND EDWARD L. POOLE, OF BALTIMORE, MARYLAND.

AUTOMATIC PHOTOGRAPHIC APPARATUS.

SPECIFICATION forming part of Letters Patent No. 396,428, dated January 22, 1889.

Application filed January 9, 1888. Serial No. 260,204. (No model.)

*To all whom it may concern:*

Be it known that we, WILLIAM R. POPE and EDWARD L. POOLE, citizens of the United States, and residents of Baltimore, in the State of Maryland, have invented certain new and useful Improvements in Automatic Photographing Apparatus, of which the following is a specification.

Our invention has for its object to automatically secure photographs without the various hand operations heretofore required for such purposes, and to effect the automatic operations through the medium of motor appliances set in operation by releasing a catch by the introduction of a coin into a hole, or otherwise, as fully set forth hereinafter, and as illustrated in the accompanying drawings, in which—

Figure 1:
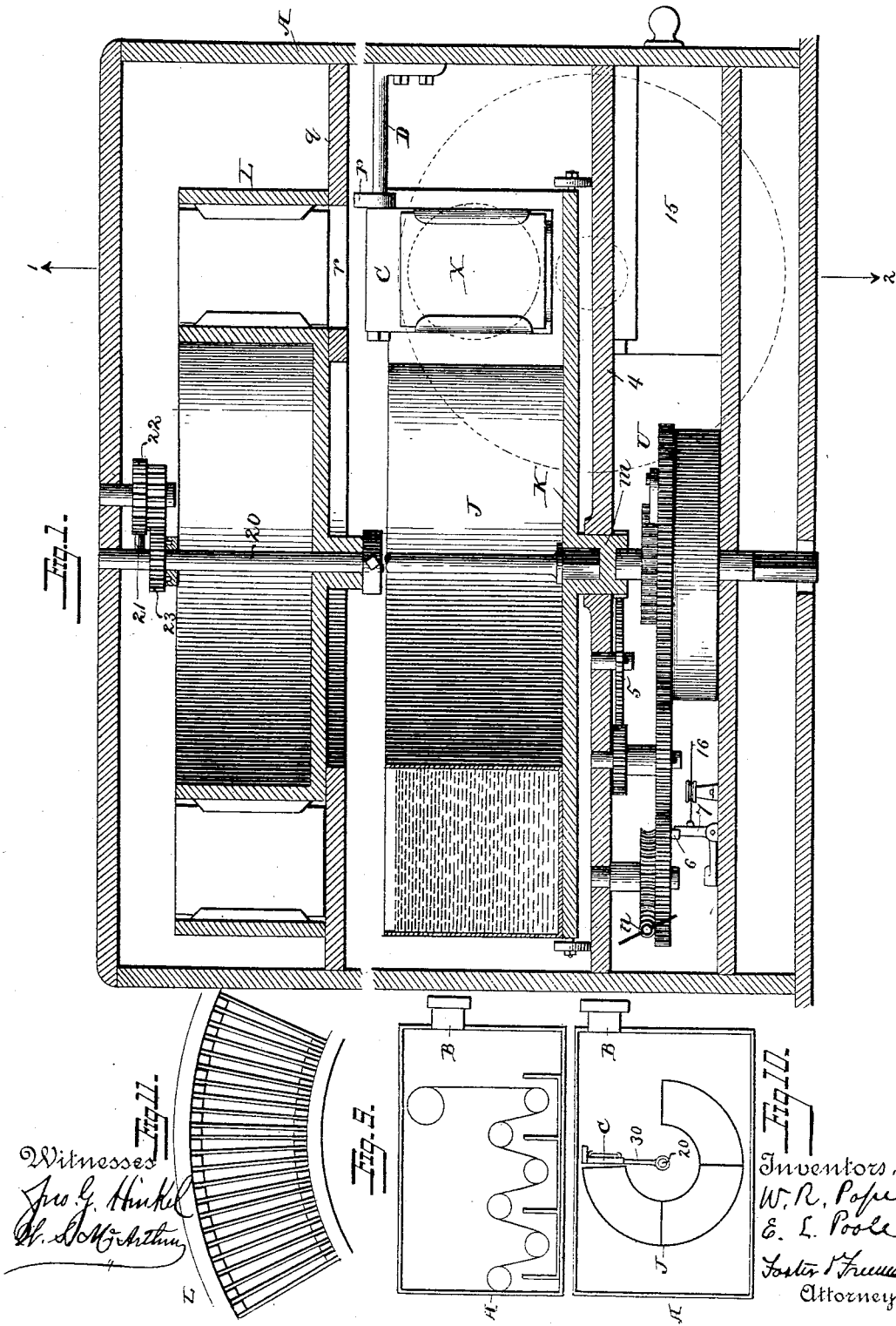
Figure 2:
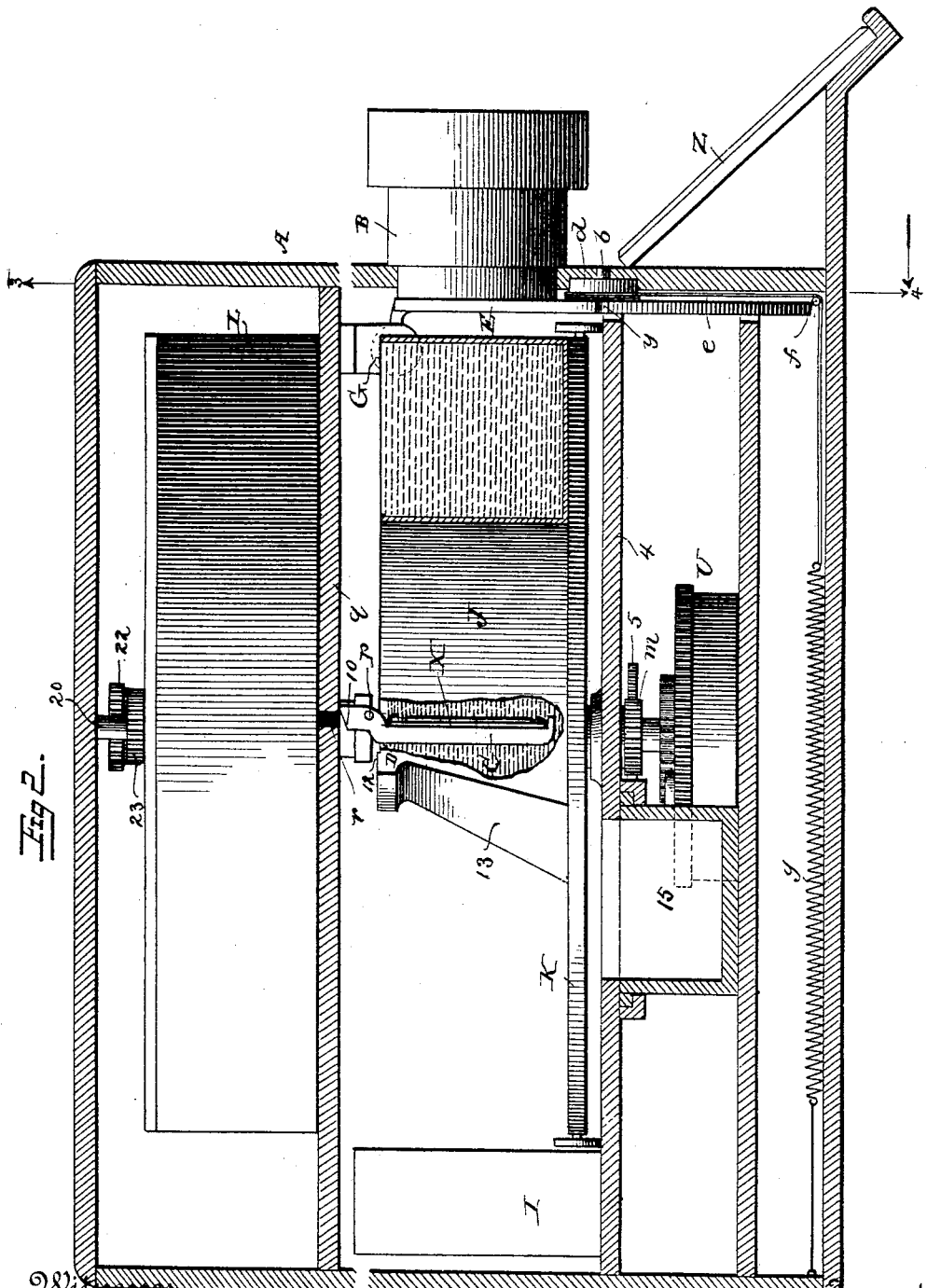
Figure 3:
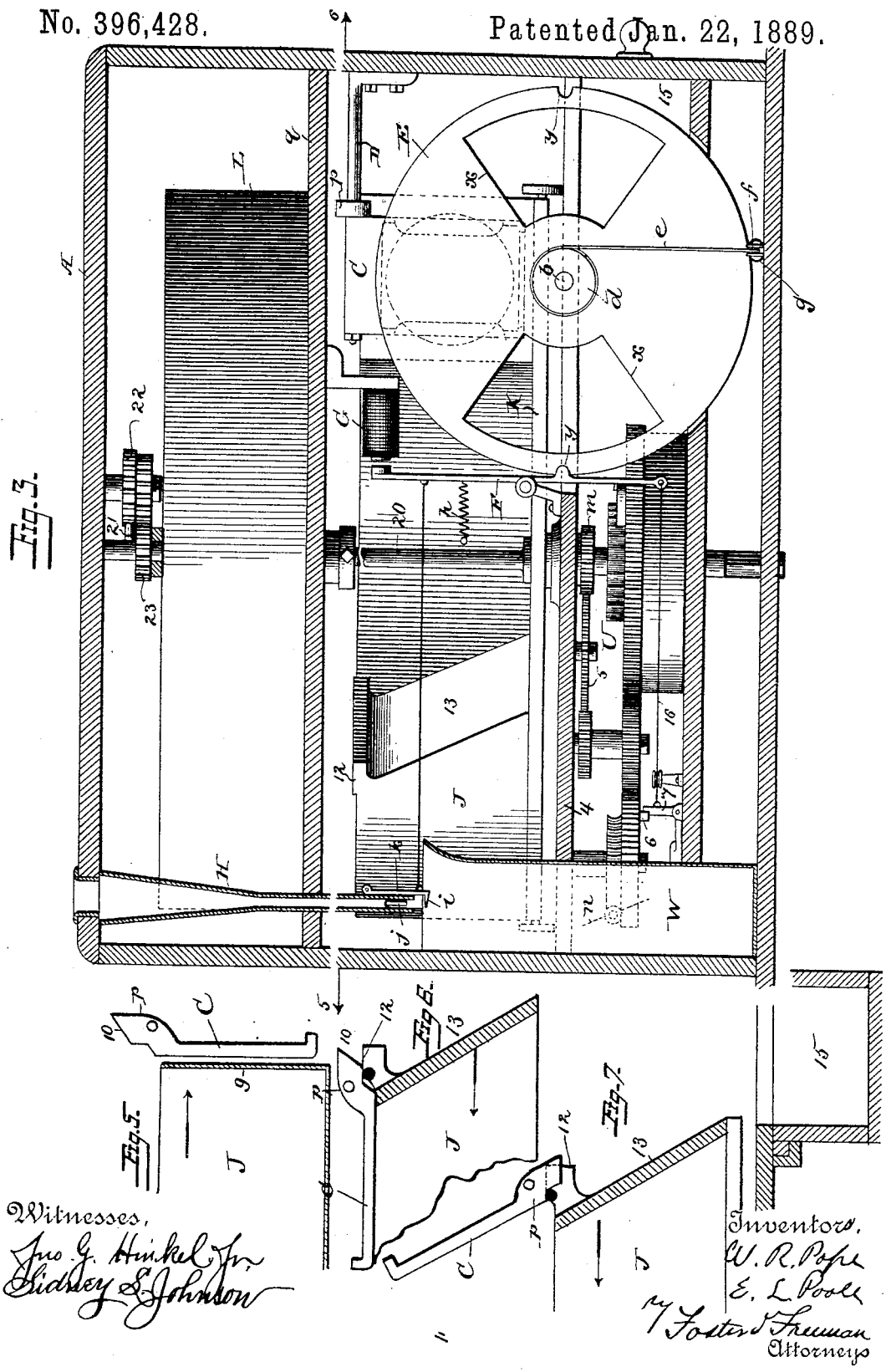
Figure 4:
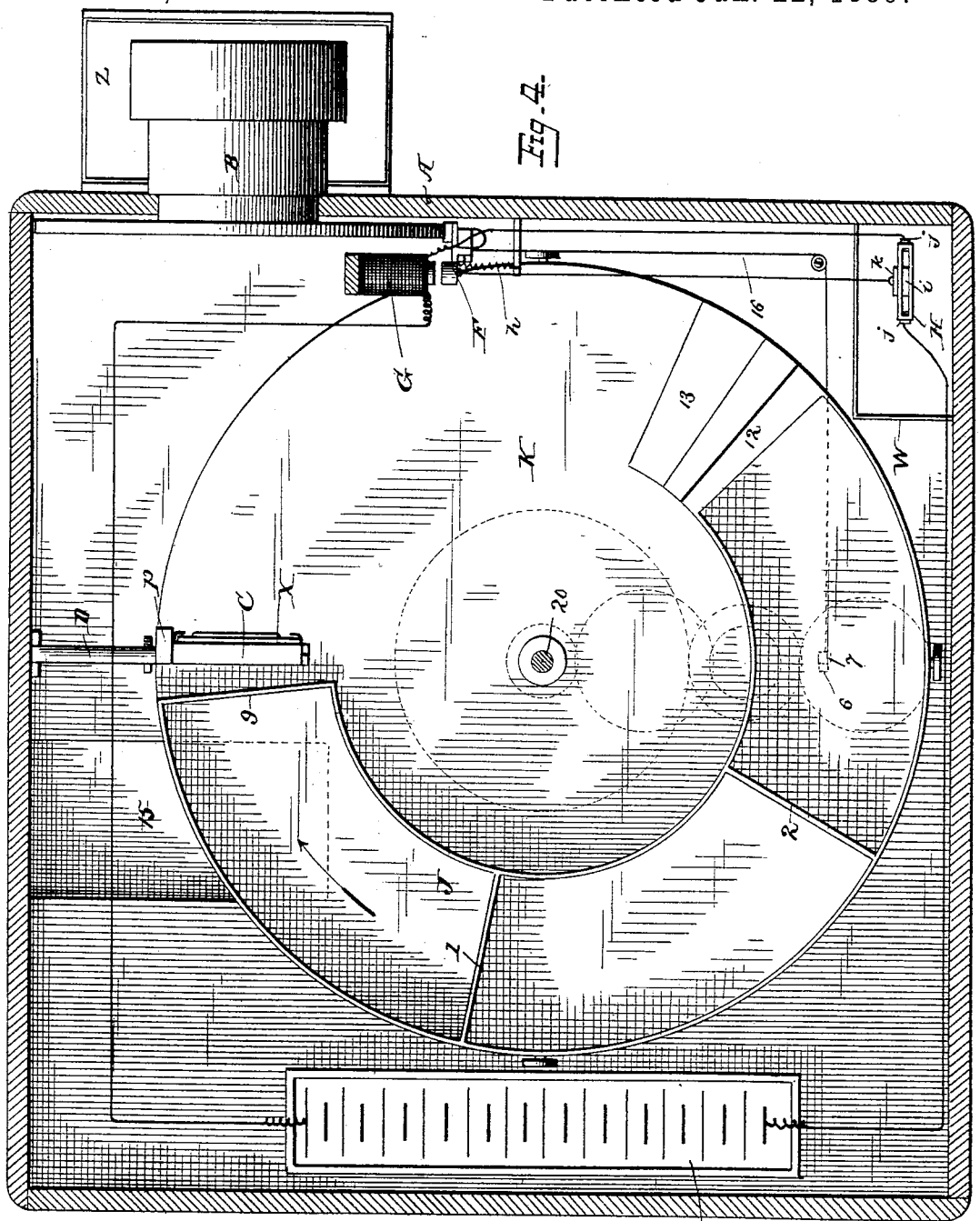
Figure 8:
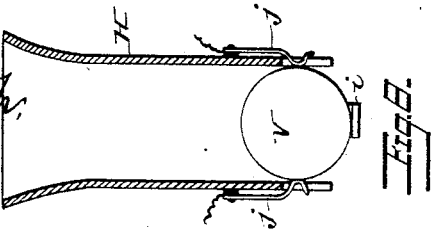

Figure 1 is a transverse section of a camera provided with appliances for carrying out our invention. Fig. 2 is a sectional elevation on the line 1 2, Fig. 1. Fig. 3 is a transverse section on the line 3 4, Fig. 2, looking in the direction of the arrow. Fig. 4 is a sectional plan on the line 5 6, Fig. 3. Figs. 5, 6, and 7 are views illustrating the manner of introducing the plate into the baths and finally discharging it. Fig. 8 is a transverse section of the coin-holder, and Figs. 9 and 10 are views illustrating modifications.

The box A of the camera is suitably shaped to inclose the contents, and is provided with a lens-holder, B, and lens arranged to throw the image of the object photographed upon a plate, X, held by a plate holder or carrier, C. As shown, the plate-carrier is a frame swinging on a bracket, D, open at the top and front and provided with side and bottom lips to retain a rectangular prepared plate of glass, metal, card-board, leather, or other material.

Between the plate and the lens is arranged a shutter, E, of any usual construction. As shown, the shutter is a disk revolving on a stud, $b$, supported by the front of the box and provided with slots $x$ $x$, which determine the exposure as the disk revolves, and a catch-lever, F, engages notches $y$ in the periphery of the disk and retains it normally in position to cut off the passage of light from the lens to the plate. A suitable motor serves to revolve the disk. For instance, a cord, $e$, passes round a hub, $d$, on the disk E, round a guide-roller, $f$, and is connected with a spring, $g$, which, when the disk is released, turns the same.

The catch F may be operated by pushing a button or rod by hand; but we prefer to operate it by the depositing of a piece of money in a receptacle, the weight, size, or contact of the money serving to operate the catch, release the disk, and insure the reproduction upon the plate of the image of the person in front of the lens. We prefer to operate the catch electrically, by means of an electro-magnet, G, the armature of which is on or connected with the catch, the exciting of the magnet swinging the catch in one direction and a spring, $h$, drawing it back. The magnet is excited on the completion of a circuit by the deposit of a coin, V, in a pocket or case, H, having a movable lip, $i$, at the bottom and two spring contact-pieces, $j$ $j$, at the sides, in circuit, when a coin of proper size is between them, with the electro-magnet and with a battery, I. The lip $i$ is a part of a hinged flap, $k$, connected with the catch F in any suitable manner, so that when the coin is deposited in the pocket the magnet will instantly attract its armature, release the coin, and let it drop into a receptacle, W, and simultaneously release the disk E, which will turn until the next notch $y$ is entered by the catch, one of the slots $x$ passing the lens and permitting a limited exposure of the plate. By this means the deposit of the coin automatically operates the shutter.

After the plate is exposed it must be developed, washed, &c., according to the character of the print, and the plate then withdrawn from the case. This may be done by imparting a movement to the plate, transferring it from one bath to another, or by reversing such operations and bringing the baths to the plate. We prefer the latter method, the baths being contained in a curved trough, J, divided by partitions 1 2 to form three receptacles, the first containing, say, a developing solution, the second water, and the third a toning solution. This trough is arranged upon or forms part of a turn-table, K, which is provided with a hollow rack-stud, $m$, extending through an opening in a horizontal partition, 4, of the box A, and gearing with one of the wheels 5 of a clock-work motor, U, capable of being wound up from time to time from the outside of the box. A wind-wheel brake, n, limits the speed of movement of the train, and a stop, 6, on one of the wheels, by contact with a weighted stop-lever, 7, serves to arrest the movement of the train after each complete revolution of the table has been made.

The trough J moves in the direction of the arrow, Fig. 4, and as the end 9 of the trough strikes the suspended plate-carrier it brings it to a horizontal position until it drops from said end and swings into the bath. The partition 1 strikes the carrier and raises it from the first bath and it drops into the second, and then, after being raised by the partition 2, into the third bath. By varying the lengths of the sections the time of immersion in each may be determined as desired.

To remove the plate from the carrier, the latter is inverted after the plate passes from the last bath. One means of reversing the position of the carrier consists in providing it with a side projection, p, having a flat face, 10, which, when struck by the end of a rib, 12, on the trough, Fig. 6, turns up the carrier to the position shown in Fig. 7, and holds it thus until the plate X slides down an incline, 13, at the end of the trough, and thence through a hole in the bottom of the box into a drawer or other receptacle, 15.

The movement of the trough is started automatically as the catch F is vibrated by the electro-magnet or other device, through the medium of a connection between said catch and the stop device 7. Thus a wire, 16, extends from the end of the catch-lever to the stop-lever and constitutes said connection.

It will be evident that the construction of the shutter-operating devices will vary according to the character of the shutters, various forms of which may be used.

When separate prepared plates are used, it is necessary to employ a plate rack or receptacle to supply them in succession to the holder. This rack may be constructed and operate in different ways. In the drawings a circular rack, L, is shown, turning about a vertical shaft, 20, connected with the table J, and with guides supporting the plates X radially above a fixed shelf, q, having a slot, r, directly above the carrier C, so that when the rack L is moved to bring a plate X above the slot r the plate will drop through said slot into the carrier.

The rack is moved in any suitable way one step to each rotation of the table. Thus the shaft 20 has a pin, 21, which at each rotation of the table strikes one tooth of a double gear-wheel, 22, turning on a stud at the top of the box and gearing with a central pinion, 23, on a cross-bar of the rack-box, the shaft 20 passing loosely through said pinion.

We do not limit ourselves to a rotating rack or receptacle, as we have devised another arrangement with a rack traveling in a straight line, and when separate plates are not used we use a reel-carrier for winding the prepared flexible strip on which the pictures are taken, as shown in Fig. 8. In this case the strip is carried over guide-rollers through the several baths, and sections are cut off from the end to separate the various pictures. It will thus be obvious that without departing from our invention we may use different forms of carriers, according to the character of what we term the "plates," by which we include separate plates and continuous divided strips.

Where fixed baths are used, the carrier C is suspended from an arm, 30, extending from the shaft 20, which is rotated to carry the holder into the various baths arranged in a circle, as shown in Fig. 9.

It will be seen that, whatever may be the construction of the plate-carrier and means of conducting the plates to and from the baths, the operations may be effected automatically as the result of moving the catch, either by depositing a certain coin in its receptacle or otherwise, the plate being first exposed, then conducted successively through the baths and then discharged from the box.

It will be evident that other means than a coin may be employed to set the automatic apparatus in motion—as a button—which moves the catch-lever F.

The main motor V may operate the shutter. We prefer, however, to use a supplemental spring, as described.

To throw the light properly on the object photographed we may use one or more reflectors, Z.

Without limiting ourselves to the precise construction and arrangement of parts shown, we claim—

1. The combination, in an automatic photographing apparatus, of a camera for prepared plates, baths to receive said plates in succession, a shutter, and an actuating motor and detent, and detent-operating device, whereby on the release of the detent the shutter, carrier, and plates are automatically moved to first expose the plates and then pass them successively through the baths, substantially as described.

2. The combination, with a camera, of a plate-carrier within the same constructed to support a series of separately-detachable plates, a plate-holder to receive the plates from the carrier, a shutter, a detent, a motor, whereby said carrier is automatically moved to feed the plates into the field of the lens after each exposure, and the baths, substantially as described.

3. The combination, with a camera, of a movable plate-carrier, baths, shutter, automatic carrier, and shutter operating and stop devices, and stop-actuating mechanism, substantially as set forth.

4. The combination, with a camera, of a movable plate-carrier and baths and shutter within the same, and carrier and shutter actuating and stop devices, a coin-holder, and connections between the same and the stop, whereby the latter is released in the presence of a coin, substantially as described.

5. In an automatic photographic apparatus, a plate-carrier, baths, shutter, electric stop arranged within a camera, and generator electrically connected with said stop, and a coin-holder having points connected with the generator and arranged to contact with a coin in said holder to complete a circuit, substantially as described.

6. The combination, with a camera, of a plate-carrier and a series of baths, a motor connected to move the parts to carry the plate to and from the baths, and a stop and stop-actuating device, substantially as described.

7. The combination, in a camera, of a plate-carrier, shutter, motor, electric stop, and coin-holder electrically in line with the generator and stop, and with contacts arranged to complete an electric circuit to withdraw the stop when a coin is in the holder, substantially as described.

8. The combination, with a camera, box and plate-holder, of a shutter, an electric shutter-actuating mechanism, and a coin-holder electrically in line with said actuating mechanism and a battery, and with contacts arranged to contact with opposite sides of a coin in the holder to complete the circuit, substantially as set forth.

9. The combination, with a camera, shutter, and stop device, of a coin-holder provided with a movable retaining device connected with the shutter-stop device to be operated thereby to release the coin when the shutter is released, substantially as set forth.

10. The combination, with a camera, of a plate-holder, a series of baths, a motor connected to move the parts to introduce the holder in succession into said baths, a stop for holding said motor out of action, a coin-holder, and connections between the latter and the said stop, whereby the motor is released as the coin passes through the holder, substantially as set forth.

11. The combination, with the camera, plate-carrier, baths, spring-motor, and motor-stop device, of a shutter and actuating device, a shutter-catch connected with said stop device, and a coin-holder provided with a retaining device connected with said catch, substantially as set forth.

12. The combination, with the camera and pivoted plate-holder therein, of a movable rack carrying a series of plates for supplying said holder with said plates in succession, and the movable baths, substantially as set forth.

13. The combination, in a camera, of a movable plate-holder and a series of baths, and actuating means for carrying said holder from one bath to another in succession, and plate-discharging mechanism for discharging each plate after it passes through the last bath, substantially as set forth.

14. The combination, with a camera, of a shutter and a movable plate-holder, a movable rack for supplying the plate to the holder, a series of baths for receiving the plate in succession, all arranged within the camera-box, motor devices for actuating the moving parts, stops for retaining said parts normally at rest, and a coin-holder and connections between the same and said stop, substantially as and for the purpose set forth.

In testimony whereof we have signed our names to this specification in the presence of two subscribing witnesses.

WILLIAM R. POPE.
EDWARD L. POOLE.

Witnesses:
WILLIAM J. FINLEY,
GEORGE W. BARKMAN.